United States Patent [19]

Issenmann et al.

[11] Patent Number: 5,289,525
[45] Date of Patent: Feb. 22, 1994

[54] HANDOVER METHOD FOR RADIOTELEPHONE NETWORKS

[75] Inventors: Edouard Issenmann, Le Chesnay; Jean Reysset, Draveil, both of France

[73] Assignee: Alcatel Cit, Paris, France

[21] Appl. No.: 642,942

[22] Filed: Jan. 18, 1991

[30] Foreign Application Priority Data

Jan. 18, 1990 [FR] France .................. 90 00563

[51] Int. Cl.⁵ .............. H04M 11/00; H04J 3/16; H04Q 7/00; H04B 1/00
[52] U.S. Cl. .................. 379/58; 370/95.1; 379/60; 455/33.2; 455/56.1
[58] Field of Search .............. 379/39, 56, 58, 59, 379/60; 455/33.1, 56.1, 33.2; 370/95.1

[56] References Cited

U.S. PATENT DOCUMENTS

| | | | |
|---|---|---|---|
| 4,608,711 | 8/1986 | Goldman | 455/56.1 |
| 4,670,899 | 6/1987 | Brody et al. | 379/60 |
| 4,829,554 | 5/1989 | Barnes et al. | 379/58 |
| 4,912,756 | 3/1990 | Hop | 379/60 |
| 4,932,049 | 6/1990 | Lee | 379/60 |
| 5,101,501 | 3/1992 | Gilhousen et al. | 379/60 |
| 5,109,528 | 4/1992 | Uddenfeldt | 455/33.2 |
| 5,140,627 | 8/1992 | Dahlin | 379/60 |
| 5,157,661 | 10/1992 | Kanai et al. | 370/95.1 |

FOREIGN PATENT DOCUMENTS

| | | | |
|---|---|---|---|
| 0281111 | 9/1988 | European Pat. Off. | H04Q 7/04 |
| 0177725 | 7/1989 | Japan | 455/56.1 |
| 0186024 | 7/1989 | Japan | 455/56.1 |

Primary Examiner—Jin F. Ng
Assistant Examiner—William D. Cumming
Attorney, Agent, or Firm—Sughrue, Mion, Zinn, Macpeak & Seas

[57] ABSTRACT

A handover method for a cellular radiotelephone networks in which, a call having been set up with a mobile via a first transceiver of a first cell, the handover consists in handing over to a second transceiver of a second cell and in switching in the mobile from the first transceiver to the second transceiver. The switching instruction interrupts the call in a defined cut-off time interval. The instruction to hand over the call is given under conditions such that the interruption of the call which may result from the handover operation occurs during the defined cut-off time interval.

3 Claims, 1 Drawing Sheet

HANDOVER METHOD FOR RADIOTELEPHONE NETWORKS

Background of the Invention

The present invention concerns a handover method for radiotelephone networks and in particular for cellular radiotelephone networks.

Cellular radiotelephone networks are well known and are described in many publications, including, in the case of the planned pan-european network:

—the article "Le système cellulaire numérique européen de communication avec les mobiles" by B. Ghillebaert et al published in "Echo des Recherches", 1st quarter, 1988, and —the article "Le système radio-mobile ECR 900" by M. Ballard et al published in "Telecommutant", No 4, June 1989.

Briefly, the geographical coverage of a cellular network is divided into cells each of which is served by a transceiver enabling radiotelephone communication with mobiles in the cell. The transceivers of a number of cells are part of a common base station. Neighbouring base, stations are connected to a mobile switching center. The various mobile switching centers are interconnected through the standard telecommunications network. A radiotelephone call is set up via the telecommunications network, a mobile switching center, a base station and a transceiver communicating with the mobile in question.

The mobile moves around and may leave the cell. The call in progress, set up via a first transceiver forming part of a first base station, must continue via a second transceiver, possibly forming part of a second base station, to which a second mobile switching center may be connected.

Assuming that this transceiver is part of the same base station as the first, the call must be handed over from the first transceiver to the second within the base station, and similar switching is required in the mobile.

In a radiotelephone network using a synchronous clock throughout the network, as described in the document EP-A3-0174419, the handover and the switching are carried out at the same time, to minimize the duration of the interruption to the call perceived by the users. This is achieved by triggering the two operations synchronously using the synchronous clock. This technique is costly and difficult to use.

A known method of handover avoiding the need for control operations referred to a synchronous clock consists in inserting, in the base station, a three-port conference circuit of which two ports are used by the radiotelephone call, one port leading via a first branch to the telecommunications network and the second port leading via a second branch to the first transceiver. When the call needs to be handed over, as a preparatory stage a handover branch is set up from the third port of the conference circuit to the second transceiver. The mobile can then switch the call from the second branch to the handover branch at any time, without the radiotelephone call having to be interrupted other than as is required to carry out the switching. When the radiotelephone call is connected via the second transceiver, the conference circuit employed is removed from the call.

A call is transferred to a cell of a second base station in the same way, by handing over at the mobile switching center using a conference circuit in which said handover branch goes to the second base station and, within the latter, to the second transceiver.

A call is transferred to a cell of a second base station in turn connected to a second switching center by the same method, by handing over at the first mobile switching center using a conference circuit, said third branch extending in this case to the second mobile switching center and, through the latter, to the second base station and the second transceiver.

A radiotelephone handover system of this kind is open to criticism even if the radiotelephone calls are voice calls. Inserting a conference circuit and removing it causes the call to be interrupted twice and although the interruptions are short they are audible and their unwanted effects are cumulative with those of switching by the mobile, which interrupts the call for a longer period and is carried out under conditions determined by the call set up procedures and is therefore incompressible.

However, in the same way as fixed station calls, radiotelephone calls must allow for transmission of data. The use of conference circuits is then unacceptable, in some cases at least, because the conference circuit connects two input channels to the same output and combines the two inputs in a manner which, from the data transmission point of view, results in unusable output data. Summary of the Invention The invention is directed to eliminating multiple call interruptions during radiotelephone handover procedures, without using operations referred to a synchronous clock, in order to reduce the disruption to voice calls and to hand over the call without using conference circuits, as the latter are prejudicial to data communications.

The invention achieves this objective in providing a handover method for a radiotelephone network in which said handover of the call is prepared before executing the handover and switching operations by reserving said handover branch, without the latter being connected to the call in progress. This method is characterized in that a switching instruction initiating the switching operation transmitted to the mobile and the handover to the handover branch in response to the handover instruction are respectively arranged so that the relatively short interruption of the call which may result from the handover operation occurs during said predefined cut-off time interval.

To be more precise, the execution of the handover operation is delayed by an amount depending on the position in time and the duration of said cut-off time interval defined after the switching instruction and by the time-delay between transmission of the handover instruction and execution of the handover operation.

The position in time of the break caused by executing the handover operation is preferably in the middle of said defined cut-off time interval.

BRIEF DESCRIPTION OF THE DRAWINGS

The various objects and characteristics of the invention will now be explained in more detail in the following description of one embodiment of the invention given with reference to the appended figures in which.

DETAILED DESCRIPTION OF THE PREFERRED EMBODIMENT

Figure 1:
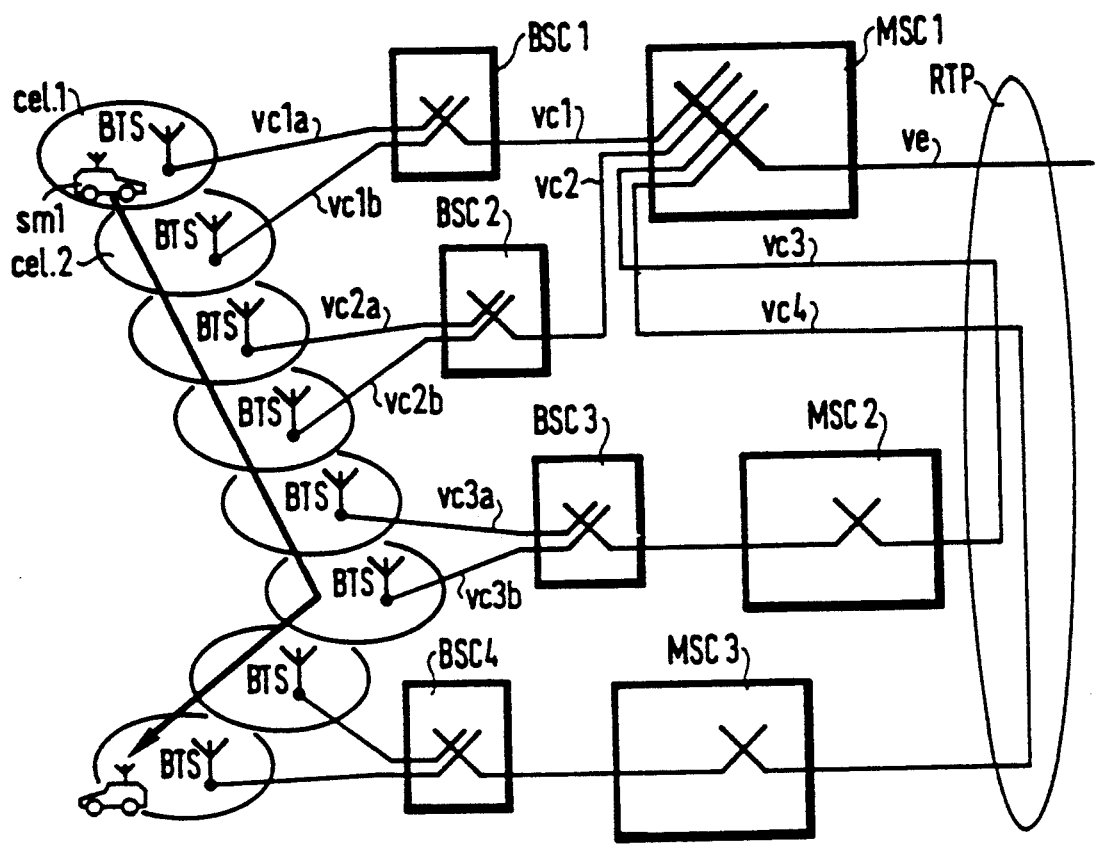
FIG. 1 shows a cellular radiotelephone network and illustrates the handover operations.

The radiotelephone network shown in FIG. 1, which is described in the second publication mentioned in the preamble to this disclosure, comprises radiotelephone transceivers BTS each covering a geographical area or cell such as the cell cel.1. These cells overlap in part and can together cover all of a country.

A mobile such as the mobile sm1 in cell cel.1 uses the transceiver BTS of the cell for radiotelephone calls.

Transceivers BTS of a number of neighbouring cells are part of a common base station which comprises control and switching equipment BSC1, BSC2, etc.

Neighbouring base stations are connected to a common mobile switching center MSC1, MSC2, etc and the mobile switching centers are connected to the general telecommunications network RTP.

A typical call from or to a mobile sm1 is set up via a communication channel ve connecting a party reached through the main telecommunications network RTP to a mobile switching center MSC1, a switching path in the center MSC1, a communication channel vc1 going from the center MSC1 to the control and switching equipment BSC1 of a base station, a switching part in the equipment BSC1, a communication channel vc1a from the equipment BSC1 to the transceiver BTS of a cell and a radio channel to the mobile sm1.

As it moves around, this mobile will leave the cell cel.1 and enter a neighbouring cell such as the cel.2. The call in progress at this time must continue via the transceiver BTS of the cell cel.2. This will require handover of the radiotelephone call from one cell to the other, in other words from one transceiver to the other. Any such handover will require the setting up of another switching path in the base station BSC1 extending via another communication channel vc1b to the transceiver of the other cell.

If the mobile enters a cell which is part of another base station, the switching to be carried out will involve setting up a switching path in the switching center MSC1 leading via a communication channel vc2 to said other base station (BSC2, for example) and via a switching path in the base station BSC2 to a communication channel (bc2a, for example) leading to the transceiver of the cell.

If the other base station is connected to another switching center, the handover will involve setting up a switching path in the switching center MSC1 via a communication channel (vc3, for example) to the base station BSC3 in question, in which a switching path will lead to a communication channel (such as vc3a) to the transceiver of the cell in question.

Switching operations to hand over the radiotelephone call when the mobile sm1 moves each comprise, as is well known from switching installations, the preparation of a handover branch by reserving switching paths and communication channels from the handover level which is represented by the symbol for a switching matrix in a base station or a switching center. A handover instruction is then given which frees the abandoned branch and connects the handover branch. The call is briefly interrupted, for around 30 ms, between freeing one branch and connecting the other.

In the mobile sm1 itself, the movement from one cell to the other requires a switching operation. This is controlled by the base station with which the mobile is communicating before the switching. It is initiated by monitoring in the mobile the level at which pilot signals are received not only from the transceiver of the cell in which the mobile is located but also from transceivers of surrounding cells. The base station is therefore able to determine whether it is necessary to hand over the call in progress for this mobile from the cell in which it is still located to a neighbouring cell. This results in the sending of a switching instruction which tells the mobile the radio channel (of the neighbouring cell) to which it will have to connect. The call is then cut off. The mobile then sets up the links with the base station (which may be the same base station or another base station) via the latter channel, after which the call is reestablished. The call is cut off for 150 ms, as specified in Recommendation No 0208 of the CEPT GSM Group ["Qualitéde service", chapter A.1.9, items a) and b)].

Figure 2:
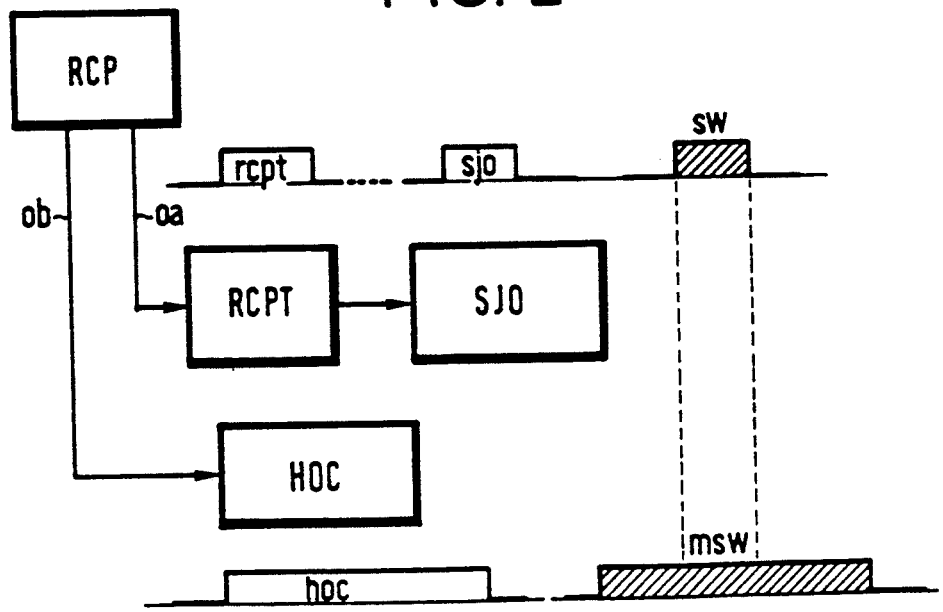
FIG. 2 shows the scheduling in time of the handover and switching operations in accordance with the present invention.

The present invention, as shown in FIG. 2, provides for the switching instruction to be transmitted to the mobile under conditions such that it causes the call to be interrupted in a defined cut-off time interval and for the instruction to execute the operation which hands over the call to the handover branch to be given under conditions such that the interruption of the call which may result from this handover operation occurs during said defined cut-off time interval.

The decision to hand over the call (RCP) is taken at any level of the network (FIG. 1). This decision gives rise to a handover instruction oa which starts a time-delay RCPT at the end of which the handover operation SJO is initiated. FIG. 2 shows the time-delay rcpt and the handover execution time-delay sjo which occurs after a time interval shown in dashed lines, and which may be comparatively short. The interruption of the call is shown at sw to the right of the time-delay sjo to clarify the description, although in fact they are substantially simultaneous.

The same decision RCP gives rise to a switching instruction ob which triggers the switching operation HOC. The duration of the switching operation is shown at hoc. The corresponding interruption of the call is shown at msw, to the right of the time-delay hoc, to locate it on the same time scale as the interruption sw.

It is clear that irrespective of the level at which the handover decision is taken, it is sufficient to choose the duration of the time-delay rcpt to time execution of the handover operation relative to the switching operation, given that the handover operation is considerably shorter than the switching operation. This makes it possible to time the call interruption sw due to the switching operation, under nominal operating conditions for the switching equipments, in the middle of the call interruption caused by the switching operation, under nominal operating conditions of the mobile and of the base stations. The interruption sw (FIG. 2) can be offset by 60 ms in either direction relative to the interruption msw by reason of unfavorable circumstances in the execution of the handover or switching operations, without prejudice to its being coincident with the latter.

Estimates indicate that this will be so in the very great majority of cases, so that the invention will generally reduce the interruption of the call caused by handing over the call to just the interruption needed for the radiotelephone call switching.

It will be noted that, apart from the saving in terms of conference circuits, the invention makes it possible to eliminate the cost, in terms of the control unit operating time, of the insertion and the withdrawal of these conference circuits, and to eliminate the delay in executing the handover necessitated by the insertion of the conference circuit, while all calls, whether voice or data, are processed the same way.

We claim:

1. A handover method for a cellular radiotelephone network for handing over a radiotelephone call established with a mobile via a first transceiver of a first cell to a second transceiver of a second cell accessing the mobile, said method comprising the steps of handing over the call at a handover level via a handover branch to said second transceiver in response to a handover instruction, with said handover step interrupting the call during a relatively short interruption time interval, and switching in the mobile from said first transceiver to said second transceiver in response to a switching instruction, said switching step interrupting the call during a relatively long predefined cut-off time interval and said handover branch being prepared before executing the handover and switching operations by reserving said handover branch, without the latter being connected to the call in progress, said method further comprising transmitting said switching instruction initiating the switching operation to the mobile and controlling timing of the handover to the handover branch in response to the handover instruction relative to said switching step so that said relatively short interruption time interval occurs during said predefined cut-off time interval.

2. A handover method for radiotelephone networks according to claim 1, characterized in that the handover instruction is delayed by a time-delay whose duration is dependent upon the position in time and the duration of said predefined cut-off time interval after the switching instruction and by a time-delay which elapses between a time at which said the handover instruction is transmitted and a time of said the handover operation.

3. A handover method for radiotelephone networks according to claim 2, characterized in that a position in time of the interruption caused by executing the handover operation is such that it is nominally in the middle of said predefined cut-off time interval.

* * * * *